(12) United States Patent
Holey

(10) Patent No.: US 12,067,389 B2
(45) Date of Patent: Aug. 20, 2024

(54) DONGLE FOR A BUILDING MANAGEMENT SYSTEM AND METHOD OF OPERATING

(71) Applicant: CARRIER CORPORATION, Jupiter, FL (US)

(72) Inventor: Gaurav Pramod Holey, Maharashtra (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 317 days.

(21) Appl. No.: 16/484,668

(22) PCT Filed: Feb. 6, 2018

(86) PCT No.: PCT/US2018/017045
§ 371 (c)(1),
(2) Date: Aug. 8, 2019

(87) PCT Pub. No.: WO2018/148199
PCT Pub. Date: Aug. 16, 2018

(65) Prior Publication Data
US 2020/0004527 A1    Jan. 2, 2020

Related U.S. Application Data

(60) Provisional application No. 62/456,788, filed on Feb. 9, 2017.

(51) Int. Cl.
*H04W 4/33* (2018.01)
*B66B 1/34* (2006.01)
(Continued)

(52) U.S. Cl.
CPC ............ *G06F 8/654* (2018.02); *B66B 1/3461* (2013.01); *B66B 5/0025* (2013.01); *G05B 15/02* (2013.01);
(Continued)

(58) Field of Classification Search
None
See application file for complete search history.

(56) References Cited

U.S. PATENT DOCUMENTS 7,451,262 B2   11/2008 Yetukuri
7,873,873 B2   1/2011  Marr et al.
(Continued)

FOREIGN PATENT DOCUMENTS

CN   201681623 U   12/2010
CN   103151062 A   6/2013
(Continued)

OTHER PUBLICATIONS

IPRP for Application No. PCT/US2018/017045 dated Aug. 22, 2019; 7 pages.
(Continued)

*Primary Examiner* — Lewis A Bullock, Jr.
*Assistant Examiner* — Mark A Gooray
(74) *Attorney, Agent, or Firm* — CANTOR COLBURN LLP

(57) ABSTRACT

A method of using a dongle connects the dongle to a USB port of a building equipment system. Once connected, remote communication with the building equipment system may be achieved via the dongle, and firmware may be downloaded to a processor of the building equipment from the dongle.

10 Claims, 6 Drawing Sheets

(51) Int. Cl.

| | | |
|---|---|---|
| *B66B 5/00* | (2006.01) | |
| *G05B 15/02* | (2006.01) | |
| *G06F 8/654* | (2018.01) | |
| *H04L 43/08* | (2022.01) | |
| *H04L 67/00* | (2022.01) | |

(52) U.S. Cl.
CPC .............. *H04L 43/08* (2013.01); *H04L 67/34* (2013.01); *H04W 4/33* (2018.02)

(56) References Cited

U.S. PATENT DOCUMENTS

| | | | |
|---|---|---|---|
| 8,680,983 | B2 | 3/2014 | Ebrom et al. |
| 9,119,236 | B1 * | 8/2015 | Martin .................... H04L 67/12 |
| 2008/0133832 | A1 | 6/2008 | Bhavnani |
| 2009/0240376 | A1 | 9/2009 | Elshafei et al. |
| 2010/0275456 | A1 | 11/2010 | Lord |
| 2012/0245878 | A1 | 9/2012 | Kane et al. |
| 2014/0115487 | A1 * | 4/2014 | Sandler ............... H04M 1/7253 |
| | | | 715/740 |
| 2014/0275881 | A1 | 9/2014 | Lamego et al. |
| 2016/0062381 | A1 * | 3/2016 | Hughes ..................... G05F 1/66 |
| | | | 700/295 |
| 2016/0098876 | A1 | 4/2016 | Oz et al. |
| 2016/0147211 | A1 * | 5/2016 | Kore ........................ H04W 4/80 |
| | | | 700/83 |
| 2016/0378630 | A1 * | 12/2016 | Narayanan ............ G06F 11/324 |
| | | | 710/18 |
| 2018/0107476 | A1 * | 4/2018 | Remis ................. G06F 11/3051 |

FOREIGN PATENT DOCUMENTS

| | | |
|---|---|---|
| CN | 202979517 U | 6/2013 |
| CN | 103489468 A | 1/2014 |
| CN | 203588454 U | 5/2014 |
| CN | 205643545 U | 10/2016 |
| TW | M416176 U | 11/2011 |
| WO | 2017011497 A1 | 1/2017 |

OTHER PUBLICATIONS

Bplus Technology Co., Ltd. U3AM (USB 3.0 Power Monitor). Retrieved Online Nov. 28, 2016.

Crystalfontz. 20×4 Character USB LCD Display. 4 pages. Retrieved Online Nov. 28, 2016.

Hanlon, Mike. New Flash Drive With Scrollable Display of Stored Files Plus SD Card Reader/Writer. News Atlas. Retrieved Online Nov. 28, 2016. 5 pages.

ISR/WO Issued Apr. 9, 2018.

AboveTEK USB Voltage Current Multimeter, Power Meter, Tester Monitor, Check Tablet Gadge. Amazon.com. Retrieved from https://www.amazon.com/AboveTEK-Voltage-Current-Multimeter-Charging/dp/B00ICR1UB6/ref=cm_cr_arp_d_product_top?ie=UTF8. Feb. 10, 2014. 8 Pages.

Mini 4GB LCD Screen Display MP3 Music Player USB with FM Radio Function Blue. Retrieved from eBay.com. Nov. 4, 2016. 3 Pages.

USB Power Charger Current Voltage Detector Tester Monitor Meter for Phone Tablet. Retrieved from https://www.ebay.com/itm/LED-Digital-USB-Cable-Charger-Doctor-Voltage-Current-Meter-Tester-Power-Detector/401184041571?hash=item5d686eaa63:g:ItEAAOSwH51dqm5i. Nov. 15, 2016. 19 Pages.

European Examination Report for Application No. 18707789.6; Issued Feb. 4, 2022; 8 Pages.

\* cited by examiner

DONGLE FOR A BUILDING MANAGEMENT SYSTEM AND METHOD OF OPERATING

CROSS-REFERENCE TO RELATED APPLICATIONS

This application claims the benefit of PCT/US2018/017045 filed Feb. 6, 2018, which claims priority to U.S. Provisional Application No. 62/456,788 filed Feb. 9, 2017, which is incorporated herein by reference in its entirety.

BACKGROUND

The present disclosure relates to a building management system and, more particularly, to a building management system adapted to communicate with an elevator video display in real-time.

Building equipment systems are known to enhance the life and/or safety of occupants, and/or protect and preserve articles, in a building. In some applications, a multitude of building equipment systems may be generally managed by a building management system configured to monitor, locally report-out, and/or control the various equipment systems. Examples of such building equipment systems may include a ventilation and cooling (HVAC) system, an elevator system, a security system, various safety system (e.g., fire protection), lighting systems, and others. In some applications, such equipment systems may be pre-existing and decades old. Such pre-existing systems and other, may have limited electronic capabilities. For example, such systems may have limited, or non-existing, remote communication capability, self-monitoring and data archiving capability, remote control capability, diagnostic capability and/or other capabilities. Improvements in the ability to easily and cost effectively upgrade or enhance the capabilities of building equipment system(s) is desirable.

SUMMARY

A method of using a dongle according to one, non-limiting, embodiment of the present disclosure includes connecting the dongle to a USB port of a building equipment system, remotely communicating with the building equipment system via the dongle, and downloading firmware from the dongle and to a processor of the building equipment.

Additionally to the foregoing embodiment, the method includes uploading data from the building equipment system and to a storage medium of the dongle.

In the alternative or additionally thereto, in the foregoing embodiment, the method includes monitoring a parameter of the building equipment system enabled by the downloading of the firmware.

In the alternative or additionally thereto, in the foregoing embodiment, the method includes sending parameter data associated with the monitoring of the parameter to a cloud server by a wireless transmitter of the dongle.

In the alternative or additionally thereto, in the foregoing embodiment, the sending of the parameter data is facilitated by Blue Tooth.

In the alternative or additionally thereto, in the foregoing embodiment, the sending of the parameter data is facilitated by Wi-Fi.

In the alternative or additionally thereto, in the foregoing embodiment, the sending of the parameter data is facilitated by global system for mobile (GSM).

In the alternative or additionally thereto, in the foregoing embodiment, the building equipment system is an elevator system.

In the alternative or additionally thereto, in the foregoing embodiment, the method includes sending a service command by a user of a mobile device, wirelessly receiving the service command by the dongle, and downloading the service command from the dongle to the processor.

In the alternative or additionally thereto, in the foregoing embodiment, the service command is remotely sent through a cloud server.

In the alternative or additionally thereto, in the foregoing embodiment, the service command is remotely sent through a mobile application.

A method of using a dongle according to another, non-limiting, embodiment includes connecting the dongle to a USB port of a building equipment system and remotely communicating with the building equipment system via the dongle, wherein the dongle facilitates wireless connectivity between the building equipment system and a mobile device.

Additionally to the foregoing embodiment, the method includes downloading firmware from the dongle and to a processor of the building equipment.

In the alternative or additionally thereto, in the foregoing embodiment, the method includes monitoring a parameter of the building equipment system enabled by the downloading of the firmware.

In the alternative or additionally thereto, in the foregoing embodiment, the method includes sending parameter data associated with the monitoring of the parameter to a cloud server by a wireless transmitter of the dongle.

In the alternative or additionally thereto, in the foregoing embodiment, the method includes sending a service command by a user of a mobile device, wirelessly receiving the service command by the dongle, and downloading the service command from the dongle to the processor.

In the alternative or additionally thereto, in the foregoing embodiment, the building equipment system is an elevator system and the remote communication enables uploading of data from the elevator system and to the mobile device.

In the alternative or additionally thereto, in the foregoing embodiment, the data is an elevator floor map.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
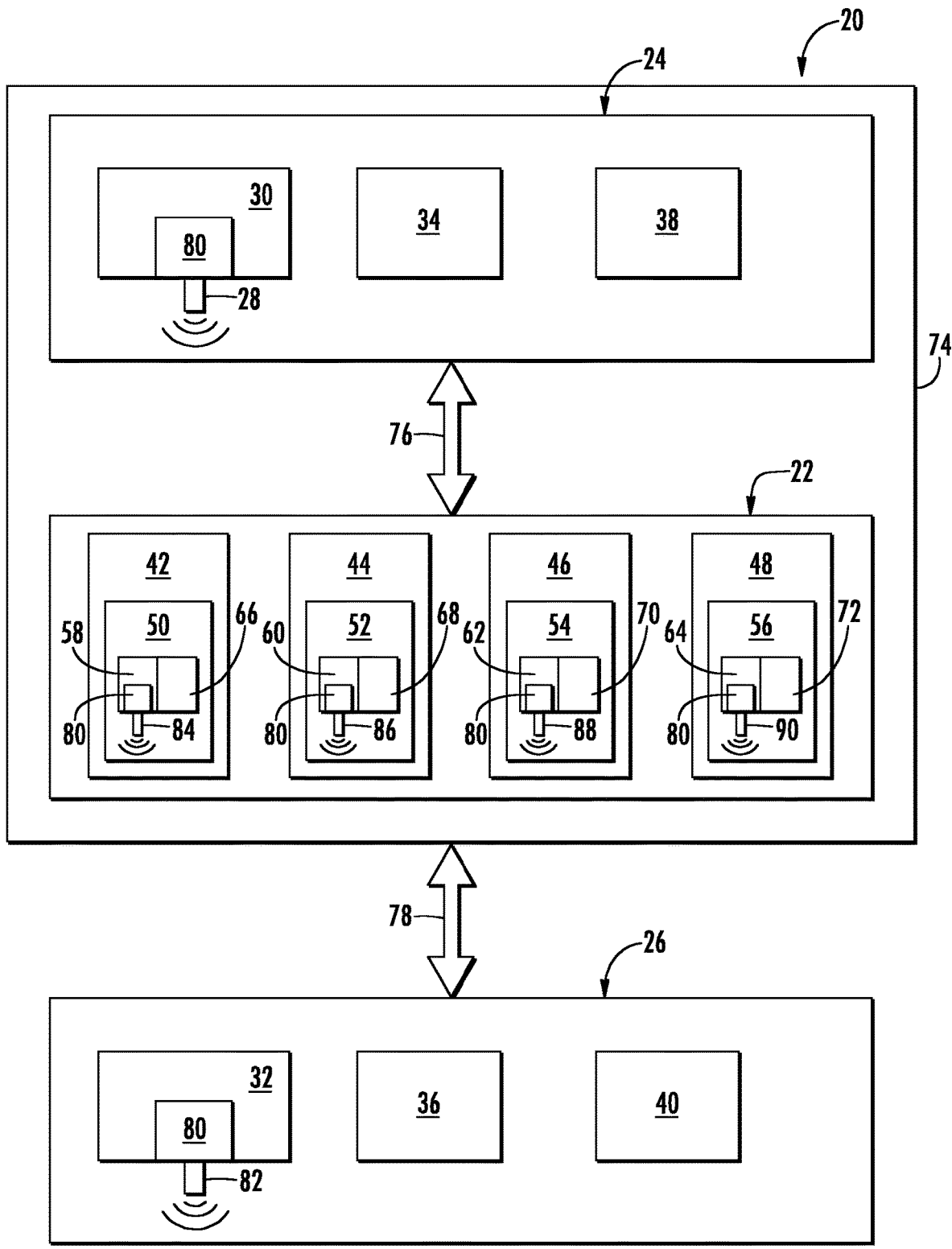
FIG. 1 is a schematic of a building management system as one, non-limiting, exemplary embodiment of the present application.

Referring to FIG. 1, an exemplary embodiment of a building management system 20 is integrated into, electronically communicates with, and/or may generally include building equipment 22, managing local control circuitry 24, remote (i.e., remotely located) control circuitry 26, and a dongle 28. The local and remote control circuitry 24, 28 may each include respective processors 30, 32, respective storage mediums 34, 36, and respective user interfaces 38, 40. The building equipment 22 may include an elevator system 42, a security system 44, a safety system 46 (e.g., fire and/or smoke detection system), a HVAC system 48, and others. Each system 42, 44, 46, 48, may include respective control circuitry 50, 52, 54, 56 that may be local. The control circuitry 50, 52, 54, 56 may each include respective processors 58, 60, 62, 64, and respective storage mediums 66, 68, 70, 72. The control circuitry 24, 26, 50, 52, 54, 56 may be computing devices. The storage mediums 34, 36, 66, 68, 70, 72 may be computer readable and writable, and may include hard disk drive storage, nonvolatile memory (e.g., flash memory or other electrically-programmable-read-only memory configured to form a solid state drive), volatile memory (e.g., static or dynamic random-access-memory), and others. The processors 30, 32, 58, 60, 62, 64 may be based on one or more microprocessors, microcontrollers, digital signal processors, baseband processors, power management units, audio codec chips, application specific integrated circuits, and others. It is understood and contemplated that any one or more of the control circuitry 24, 26, 50, 52, 54, 56 may perform part or all of the functions of the other control circuitry. Therefore, many different configurations of the control circuitry is plausible.

The building equipment 22, the local control circuitry 24 and the dongle 28 may be generally located at, or inside, a building 74. The managing, local, control circuitry 24 may communicate with the building equipment 22 over pathways (see arrow 76) that may be hard wired or wireless. The remote control circuitry 26 may be remotely located from the building 74 and may communicate with the managing local control circuitry 24 and/or the equipment control circuitry 50, 52, 54, 56 over pathways (see arrow 78) that may be hard wired or wireless. In one example, the remote control circuitry 26 may be located at a different building or facility. In another example, the remote control circuitry 26 may be mobile and may, for example, be contained within a repairman's truck and/or carried by maintenance personnel.

In one embodiment, the processor 30 of the managing, local, control circuitry 24 may monitor and/or control higher functions of the various systems 42, 44, 46, 48 based on prescribed parameters and/or operating conditions of one system that may impact, influence, or assist desired operating conditions of another equipment system. The local control circuitry 50, 52, 54, 56 of the respective systems 42, 44, 46, 48 may monitor and control lower level operating functions such as monitoring specific parameters, processing the data, and accordingly controlling specific hardware of the particular system.

In another embodiment, the building equipment 22 may include just one system, such as the elevator system 42. In this embodiment, the managing, local, control circuitry 24 may not be required, or may be part of the local control circuitry 50 of the elevator system 42.

Figure 2:
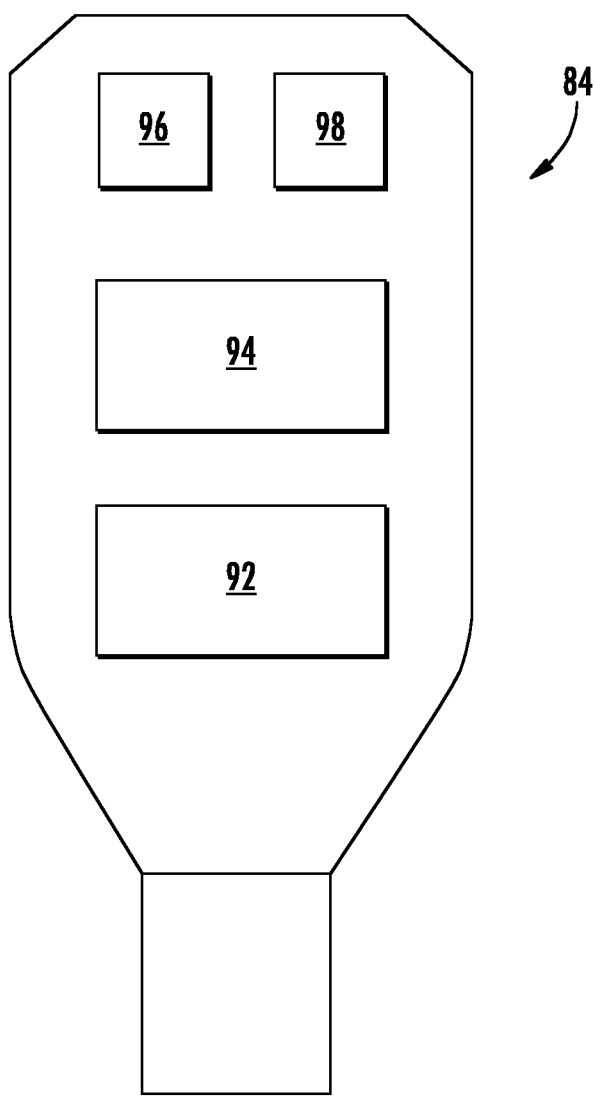
FIG. 2 is a schematic of a dongle of the building management system.

The processors 30, 32, 50, 52, 54, 56 may each include a universal serial bus (USB) port 80 adapted to receive respective dongles 28, 82, 84, 86, 88, 90 that may be smart dongles. Any one or more of the dongles 28, 84, 86, 88, 90 may generally function as a retrofit device adapted to, for example, upgrade capabilities of the building equipment 22. Referring to FIG. 2 and to simplify explanation, the dongles 28, 82, 84, 86, 88, 90 will be described with reference to the elevator dongle 84. It is, however, understood that the remaining dongles may be similar. The dongle 84 may include a processor (e.g., microprocessor) 92, a storage medium 94, a transceiver 96, and a receiver 98. The transmitter 96 is configured to transmit wireless signals indicative of conditions of the elevator system 42, wherein the elevator system may not otherwise have the ability to communicate. The receiver 98 is configured to receive signals from, for example, the remote control circuitry 26. In one example, the dongle 84 may receive firmware from the remote control circuitry 26 intended for download to the control circuitry 50 of the elevator system 42. In another example, the processor 92 of the dongle 84 may be configured to execute software stored in the storage medium 94 that facilitates the extraction of operating data from the control circuitry 50 of the elevator system 42 and storing the operating data in, for example, the storage medium 94 until it is retrieved by, for example, a serviceman via the remote control circuitry 26. It is contemplated and understood that the dongle may include a Graphic Liquid Crystal Display (GLCD) and navigation keys. Also, the transmitter and receiver may be clubbed considering hardware design perspectives.

In yet another embodiment, any two or more of the dongles 28, 82, 84, 86, 88, 90 may execute internal software or may receive external commands causing the dongles to communicate with one another. Such communication may enable the sharing of data that may improve operating conditions of any of the systems 42, 44, 46, 48.

Figure 3:
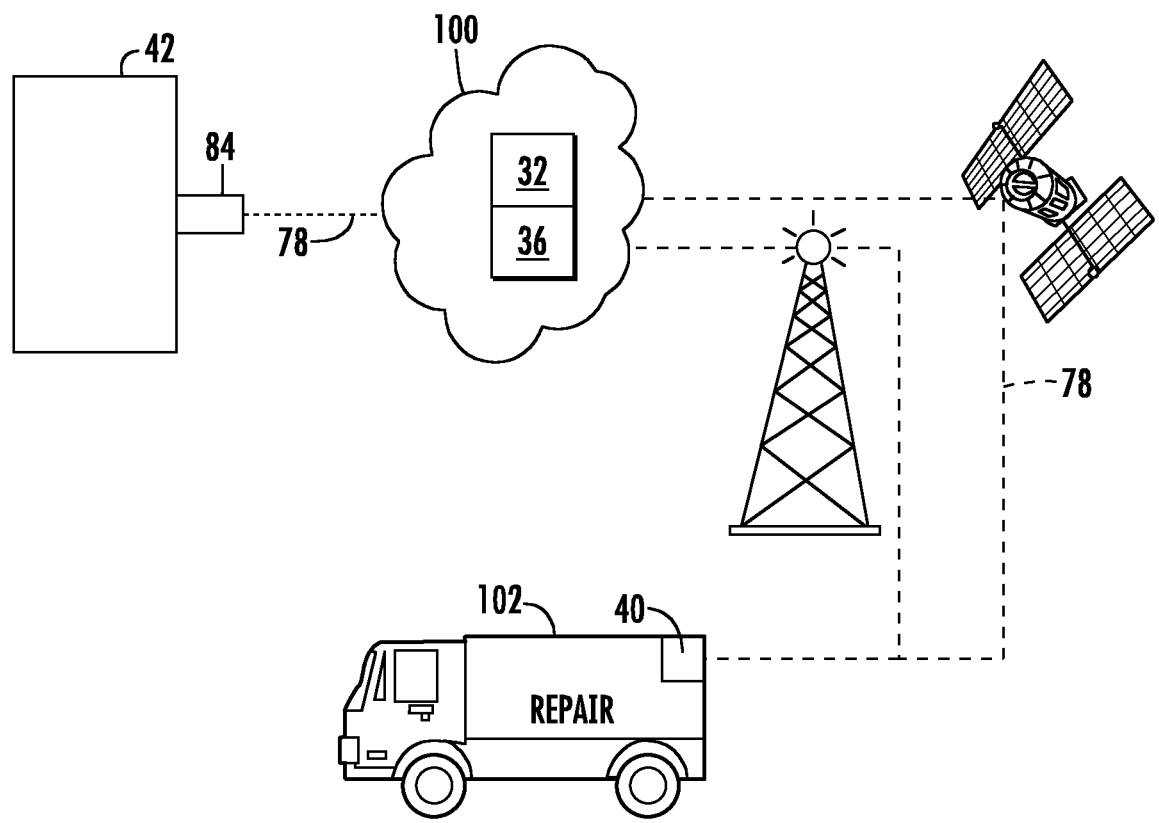
FIG. 3 is a partial schematic of the building management system illustrating a repair service vehicle and a cloud server.

Referring to FIG. 3, one embodiment of a building management system 20 is illustrated wherein the processor 32 and the storage medium 36 of the remote control circuitry 26 may be part of a cloud 100 (i.e., cloud server) and the remote user interface 40 may be located in or part of a mobile service vehicle 102. In one example, the user interface 40 may be a smart cellular telephone. The wireless signal 78 may be facilitated by any one of a Blue Tooth application, a Wi-Fi application, and a global system for mobile (GSM) application.

Figure 4:
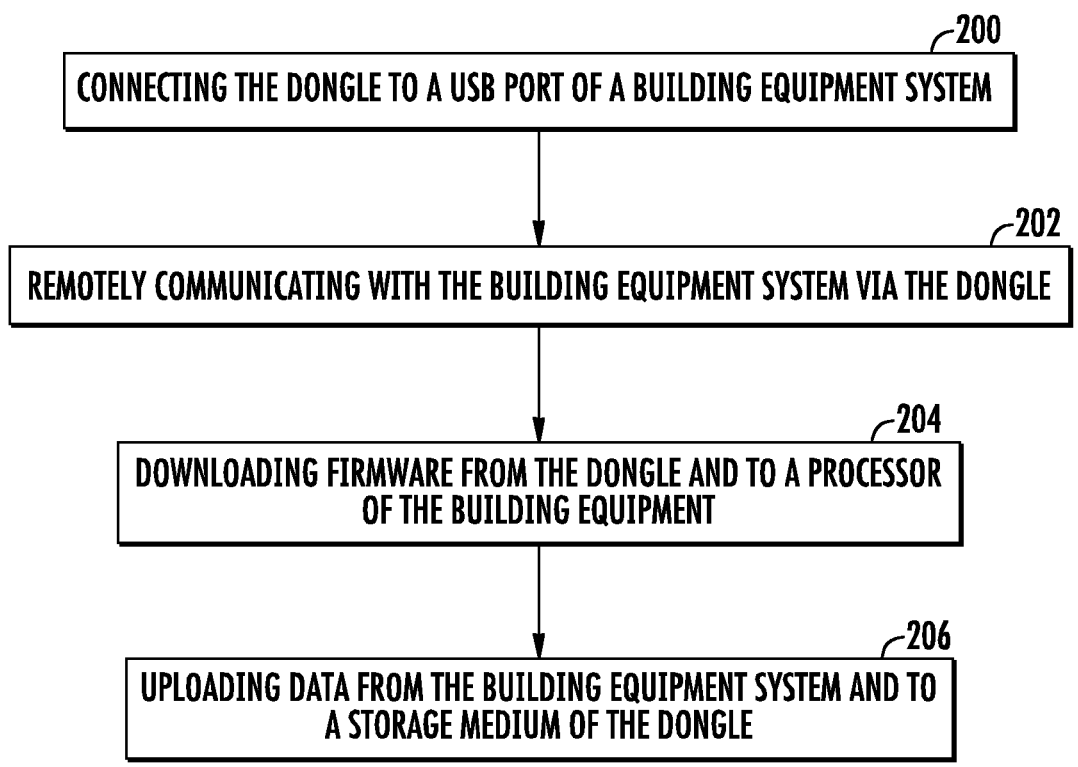
FIG. 4 is a flow chart of a first method of operating the building management system.

Referring to FIG. 4, a method of operating the building management system 20 may include block 200 that entails connecting at least one dongle 84, 86, 88, 90 to a respective USB port 80 of the respective system 42, 44, 46, 48 of the building equipment 22. At block 202, utilizing the remote control circuitry 26 to communicate with at least one of the systems 42, 44, 46, 48 via the respective dongle 84, 86, 88, 90. At block 204, software (e.g., firmware) may be downloaded from any one of the dongles 84, 86, 88, 90 to the respective processor 58, 60, 62, 64. At block 206, data (e.g., operating parameter data) may be uploaded from any one of the systems 42, 44, 46, 48 and to the respective storage medium 92 of the respective dongle 84, 86, 88, 90.

Figure 5:
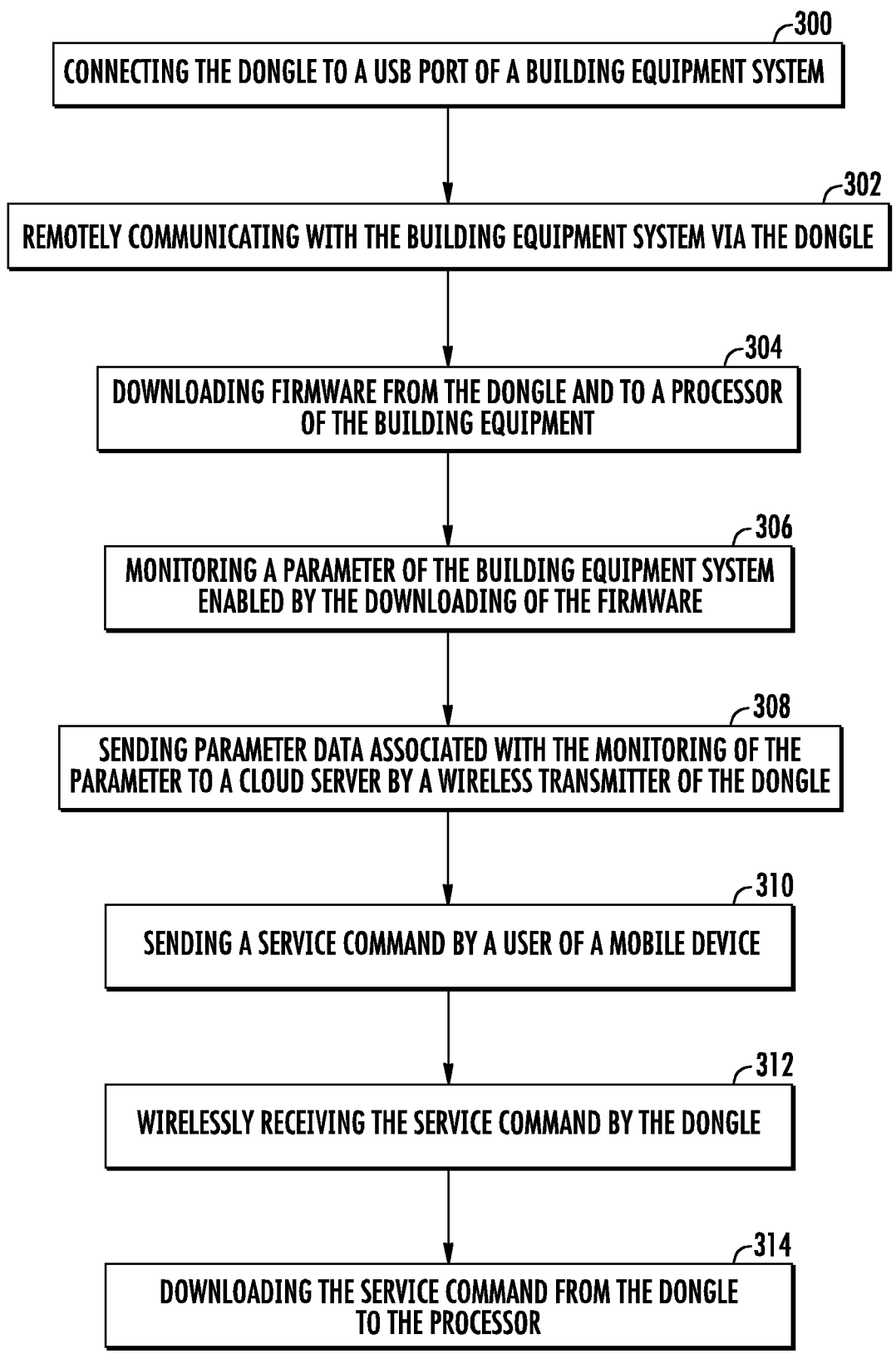
FIG. 5 is a flow chart of a second method of operating the building management system.

Referring to FIG. 5, another method of operating the building management system 20 may include block 300 that entails connecting at least one dongle 84, 86, 88, 90 to a respective USB port 80 of the respective systems 42, 44, 46, 48 of the building equipment 22. At block 302, utilizing the remote control circuitry 26 to communicate with at least one of the systems 42, 44, 46, 48 via the respective dongle 84, 86, 88, 90. At block 304, software (e.g., firmware) may be downloaded from any one of the dongles 84, 86, 88, 90 to the respective processor 58, 60, 62, 64. At block 306, parameters of at least one of the systems 42, 44, 46, 48 may be monitored, as enabled by the downloading of the software. At block 308, parameter data associated with the monitoring of the parameter may be sent to, for example, a cloud server 100 via a wireless transmitter 96 of the associated one of the dongles 84, 86, 88, 90. At block 310, a command (e.g., service command) may be wirelessly sent by a user of the user interface 40 of the remote control circuitry 26, which may be a mobile device. At block 312, the associated dongle 84, 86, 88, 90 wirelessly receives the command via the receiver 98. At block 314, the command may be downloaded from the associated dongle 84, 86, 88, 90 and to the respective processor 58, 60, 62, 64.

Figure 6:
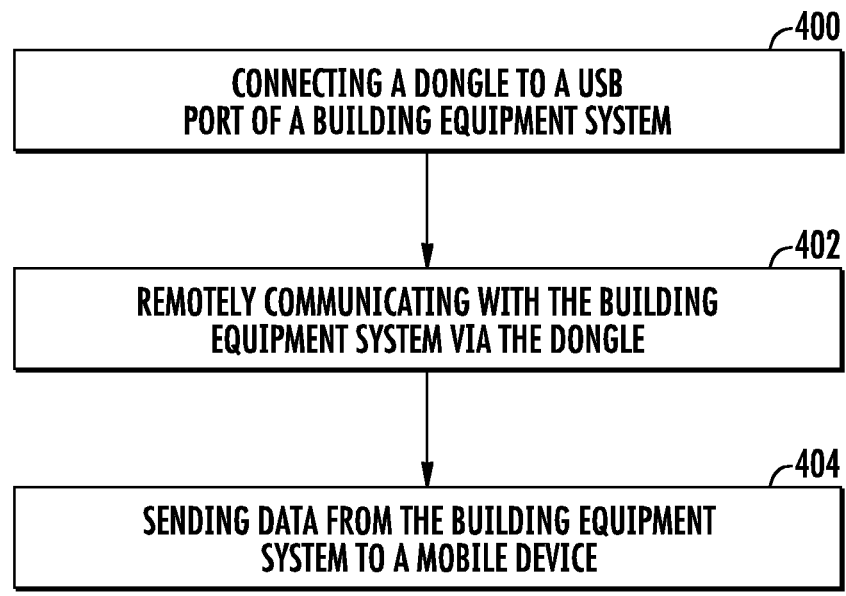
FIG. 6 is a flow chart of a third method of operating the building management system.

Referring to FIG. 6, another method of operating the building management system 20 may include block 400 that entails connecting at least one dongle 84, 86, 88, 90 to a respective USB port 80 of the respective systems 42, 44, 46, 48 of the building equipment 22. At block 402, utilizing the remote control circuitry 26 (e.g., mobile device) to communicate with at least one of the systems 42, 44, 46, 48 via the respective dongle 84, 86, 88, 90. At block 404, the respective system 42, 44, 46, 48 sends data to the mobile device 26 via the respective dongle 84, 86, 88, 90.

In one example, the mobile device 26 may be carried by a service repairman. A dongle 84 may be plugged into the elevator system 42. In operation, the mobile device 26 may communicate with the elevator dongle 84. The dongle 84 may then send a command to the elevator equipment circuitry 50 (e.g., processor 58) requesting the processor 58 to upload an elevator floor map to the dongle. The dongle 84 may then wirelessly transmit the data, relative to the elevator floor map, to the mobile device 26. The repairman may be in the building to service any type of equipment, or provide any maintenance service, that may or may not be related to elevators.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of using a first dongle of a plurality of dongles, wherein each dongle contains: a processor, a storage medium, a transceiver and a receiver, the method comprising:
connecting the first dongle to a USB port of local control circuitry of a building equipment system;
in response to the connecting, remotely communicating with the building equipment system via the USB port, while the first dongle wirelessly shares other information associated with the building equipment system with other dongles of the plurality of dongles, wherein the remotely communicating further includes:
downloading, via the USB port connection, firmware from the first dongle and to a processor of the local control circuitry of the building equipment system;
monitoring, via the receiver of the first dongle, a parameter of the building equipment system enabled by the downloading of the firmware; and
wirelessly sending, via the transceiver of the first dongle, parameter data associated with the monitoring of the parameter directly to a cloud server.

2. The method set forth in claim 1 further comprising:
uploading data from the local control circuitry and to a storage medium of the first dongle.

3. The method set forth in claim 1, wherein the building equipment system is an elevator system.

4. The method set forth in claim 1 further comprising:
sending a service command by a user of a mobile device;
wirelessly receiving the service command by the first dongle;
downloading the service command from the first dongle to the processor.

5. The method set forth in claim 4, wherein the service command is remotely sent through a cloud server.

6. The method set forth in claim 4, wherein the service command is remotely sent through a mobile application.

7. A method of using a first dongle of a plurality of dongles, wherein each dongle contains: a processor, a storage medium, a transceiver and a receiver, the method comprising:
connecting the first dongle to a USB port of a building equipment system;
in response to the connecting, remotely communicating with the building equipment system via the USB port, while the first dongle wirelessly shares other information associated with the building equipment system with other dongles of the plurality of dongles, wherein the first dongle facilitates wireless connectivity between the building equipment system and a mobile device, wherein the remotely communicating further includes:
downloading, via the USB port connection, firmware from the first dongle and to a processor of the local control circuitry of the building equipment system;
monitoring, via the receiver of the first dongle, a parameter of the building equipment system enabled by the downloading of the firmware; and
wirelessly sending, via the transceiver of the first dongle, parameter data associated with the monitoring of the parameter directly to a cloud server.

8. The method set forth in claim 7 further comprising:
sending a service command by a user of a mobile device;
wirelessly receiving the service command by the first dongle;
downloading the service command from the first dongle to the processor.

9. The method set forth in claim 7, wherein the building equipment system is an elevator system and the remote communication enables uploading of data from the elevator system and to the mobile device.

10. The method set forth in claim 9, wherein the data is an elevator floor map.

* * * * *